US005651658A

United States Patent [19]

Holmes et al.

[11] Patent Number: 5,651,658

[45] Date of Patent: Jul. 29, 1997

[54] ARTICULATED LIFT TRUCK

[76] Inventors: Arthur Jack Holmes, 1803 Rock Fence Dr., Richmond, Tex. 77469; William K. Holmes, 10474 Rock Creek Dr., San Diego, Calif. 92131

[21] Appl. No.: 321,790

[22] Filed: Oct. 12, 1994

Related U.S. Application Data

[63] Continuation-in-part of Ser. No. 94,426, Jul. 13, 1993, Pat. No. 5,370,474.

[51] Int. Cl.[6] .......... B60P 3/06; B66F 9/08

[52] U.S. Cl. .......... 414/635; 180/209; 414/467

[58] Field of Search .......... 414/631–638, 414/467; 180/209

[56] References Cited

U.S. PATENT DOCUMENTS

| | | | |
|---|---|---|---|
| 1,585,915 | 5/1926 | Hohaus | 414/634 X |
| 3,071,270 | 1/1963 | Baker | 414/635 |
| 3,366,260 | 1/1968 | Salna et al. | 414/632 |
| 3,484,964 | 12/1969 | Jeffery, Jr. | 414/635 |
| 3,799,379 | 3/1974 | Grether et al. | 414/467 |
| 3,908,849 | 9/1975 | Carroll | 414/634 |
| 4,235,308 | 11/1980 | Davis | 414/636 X |
| 4,396,341 | 8/1983 | Brouwer et al. | 414/467 |
| 4,826,474 | 5/1989 | Holmes | 414/467 X |
| 4,859,133 | 8/1989 | Maria | 414/636 X |
| 5,217,342 | 6/1993 | Grether | 414/635 |
| 5,370,494 | 12/1994 | Holmes et al. | 414/635 |
| 5,482,141 | 1/1996 | Wilson | 414/635 X |

FOREIGN PATENT DOCUMENTS

| | | | |
|---|---|---|---|
| 571395 | 1/1962 | Belgium | 414/631 |
| 753503 | 2/1967 | Canada | 414/633 |
| 2402704 | 8/1974 | Germany | 414/467 |
| 2601668 | 7/1976 | Germany | 414/467 |
| 555970 | 2/1957 | Italy | 414/633 |

*Primary Examiner*—David A. Bucci
*Attorney, Agent, or Firm*—Bill B. Berryhill

[57] ABSTRACT

A self-propelled lift truck comprising a forward carriage assembly, which includes a pair of spaced apart ground engageable wheels and a vertical mast on which is mounted a forwardly projecting fork assembly for lifting and lowering of loads thereon by relative upward and downward movement and a rearward carriage assembly which includes at least one ground engageable wheel and on which is supported a power source for operating components of the lift truck. The forward and rearward carriage assemblies are connected by an articulated support assembly which includes forward, intermediate and rearward transversely spaced apart support members. The foremost ends of the forward support members are pivotally attached to the forward carriage assembly. The rearmost ends of the rearward support members are pivotally attached to the rearward carriage assembly. Power devices connected to at least one of the forward support members and one of the rearward support members are activatable to effect relative angular displacement of the support members so the forward and rearward support members are in vertically folded positions adjacent each other to move the rearward carriage assembly immediately adjacent and to the rear of the forward carriage assembly.

20 Claims, 3 Drawing Sheets

ARTICULATED LIFT TRUCK

CROSS-REFERENCE TO RELATED APPLICATION

The present application is a continuation-in-part of U.S. patent application Ser. No. 08/094,426, filed Jul. 13, 1993, now U.S. Pat. No. 5,370,474.

BACKGROUND OF THE INVENTION

1. Field of the Invention

The present invention pertains to self-propelled lift trucks. Specifically, the present invention pertains to self-propelled lift trucks especially suitable for lifting and lowering of loads onto and from slightly elevated surfaces. Even more specifically, the present invention pertains to self-propelled lift trucks which are suitable for loading and unloading loads onto and from the bed of a truck or trailer and for street or highway transportation on said truck or trailer.

2. Description of the Prior Art

Self-propelled lift trucks have been in existence for many years. The typical lift truck comprises a low heavy frame mounted on wheels with lifting forks extending forwardly therefrom. The forks form part of an assembly which is usually mounted for up and down movement on vertical tracks of a vertical mast of some type. The mast may be tipped or slightly inclined toward the rear of the lift truck to prevent spilling of its load. In addition, heavy counterweights are typically attached to the rear of the lift truck to help counterbalance loads carried on the forks at the forward end thereof since the location of the front wheels at the base of the mast act as a pivot point.

Most self-propelled lift trucks or "forklifts", as they are sometimes called, are typically used for lifting and moving heavy objects from one place to another at the same facility, such as a manufacturing plant. In more recent years, self-propelled lift trucks have been used for loading and unloading heavy loads on and from the beds of trucks or trailers for highway transportation, sometimes without the benefit of a loading dock. Lift trucks of this type usually have some type of mast which allows elevation of the lifting forks, and the loads thereon, at more elevated positions than lift trucks or forklifts of the prior art. This allows loading and unloading from the beds of road vehicles. Examples of such self-propelled lift trucks are shown in U.S. Pat. Nos. 3,826,393 and 4,395,190. To prevent such lift trucks from being overly heavy, they may be designed to straddle the load with their wheels so that the center of gravity, when loaded, is between the front and rear wheels. However, such wide wheel spread may create problems of accessibility to a load and lowering of loads.

Many cargos are loaded with materials from a concentrated source of such materials and transported to points of use where there are no lift trucks for unloading these materials. Unloading of the delivery vehicle in these cases is very difficult and labor intensive. In addition, such unloading is sometimes accomplished by makeshift methods which are dangerous to personnel involved. For this reason, in recent years, some lift trucks have been designed for loading a vehicle and then being loaded on or attached to the vehicle for transportation with the load of materials to its ultimate destination where the lift truck is utilized in unloading the materials. In fact, the self-propelled lift trucks of the aforementioned U.S. Pat. Nos. 3,826,393 and 4,395,190 may have been utilized in this manner. However, in transporting such a lift truck by attaching it to the load carrying vehicle, the lift truck is typically attached to the rear of the vehicle and hangs in a cantilevered fashion from the rear thereof, extending sixty to eighty-four inches rearwardly. Even though the lift trucks designed for this purpose may not be as heavy as some of the lift trucks of the prior art, the fact that the concentration of weight or center of gravity thereof is so far to the rear of the load carrying vehicle's rear axle, may result in accelerated tire wear, instability of the load and less maneuverability of the vehicle. Furthermore, the cantilevered extension of the lift truck to the rear of the vehicle may create safety and traffic hazards and may violate many state traffic laws.

Thus, even though improvements have been made in self-propelled lift trucks which enable the loading and unloading of materials at truck or trailer bed elevations which, in some cases, allows the lift truck to be transported with the load so that it may be used at the point of delivery, further improvements are needed. The self-propelled lift truck disclosed in the aforementioned U.S. patent application Ser. No. 08/094,426 is such an improvement. Such a lift truck provides a forward carriage assembly having a pair of spaced apart ground engageable wheels and a vertical mast on which is mounted a forwardly projecting fork assembly for related upward and downward movement of a load thereon. A rearward carriage assembly, which includes at least one ground engageable wheel and on which may be supported a power source and related controls, is uniquely connected to the forward carriage assembly by at least a pair of spaced apart support members which are pivotally connected at opposite ends to the forward and rearward carriages, respectively. A power device is connected to the support members so that they will move between horizontal positions and vertical positions. Power lift apparatus, by which the fork assembly may be raised and lowered, is also designed to lift the entire lift truck off of the ground for support on the rear of the vehicle on which a load is to be loaded and/or unloaded.

Self-propelled lift trucks which are capable of loading and unloading trucks without a loading dock and which are easily adapted for transport with the load for use in unloading should find great acceptance in many types of industries. Continued improvement in the design of such apparatus will be sought.

SUMMARY OF THE PRESENT INVENTION

The present invention is for a self-propelled lift truck of the type having a fork assembly for lifting and lowering of loads thereon, especially suitable for loading and unloading loads at moderately elevated positions such as the bed of a truck or trailer. To accomplish this purpose, the self-propelled lift truck of the present invention includes a forward carriage assembly having a pair of spaced apart ground engageable wheels and a vertical mast on which is mounted a forwardly projecting fork assembly for relative upward and downward movement thereon. A rearward carriage assembly is provided which includes at least one ground engageable wheel and on which may be supported a power source and controls for operating various components of the lift truck. The forward and rearward carriage assemblies are connected by a unique articulated support assembly which comprises forward and rearward transversely spaced apart articulated support members. In a preferred embodiment, there are two pairs of forward support members and two pairs of rearward support members each of which has upper and lower elongated members of substantially equal length. The foremost ends of the forward support members are pivotally connected to the forward carriage assembly. The rearmost ends of the rearward support members are pivotally connected to the rearward carriage assembly. The rearmost ends of the forward support members and the foremost ends of the rearward support members are pivotally connected to one of a pair of transversely spaced apart support plates. Each forward pair of support members and each rearward pair of support members define a parallelogram.

A forward power device is connected to the forward carriage assembly and to at least one elongated forward support member. A rearward power device is connected to the rearward carriage assembly and at least one elongated rearward support member. If the forward carriage assembly, and thus the forward pivot point of the forward elongated support members, is restrained, activation of the forward power device will cause the forward support members to pivot at their attachment with the forward carriage assembly and move between relatively horizontal positions and relatively upward vertical positions. Subsequent or simultaneous activation of the rearward power device will cause the rearward support members to pivot between relatively horizontal positions and relatively downward vertical positions so that the forward and rearward carriage assemblies are folded together.

The vertical mast and fork assembly of the self-propelled lift truck of the present invention are operatively connected and provided with power lift apparatus for effecting upward and downward movement of the fork assembly relative to the mast. The mast and the power lift apparatus are so designed that if the fork assembly is restrained in a vertically fixed position, the mast, the carriage assemblies and the support members (the entire lift truck) may be lifted off the ground by the power lift apparatus.

The self-propelled lift truck of the present invention is capable of loading materials onto and from surfaces which are moderately elevated from the ground, such as the beds of trucks or trailers of road vehicles. In addition, the self-propelled lift truck of the present invention is capable of engagement with the truck or trailer, vertical self-lifting off of the ground and pivoting of the forward and rearward carriage assemblies so that the support members pivot to parallel vertical positions adjacent the mast, leaving the forward and rearward carriage assemblies in close folded proximity. This places the lift truck in a traveling position which has substantially less rearward projection, minimizing the rearward shift of center of gravity, lowering the center of gravity relative to other designs and thereby improving vehicle stability and maximizing traffic safety.

Thus the self-propelled lift truck of the present invention provides a lift truck which provides the lifting capabilities of self-propelled lift trucks of the prior art. Like only a few lift trucks of the prior art, it provides such lifting capabilities suitable for both lifting and unloading of loads onto and off of surfaces such as the bed of a truck or vehicle. Most uniquely, all these features are provided in a self-propelled lift truck which is capable of self-attachment, self-lifting and self-pivoting or articulation from a normal working position to a folded position for transport on the rear of the vehicle. The lift truck of the present invention is easy to operate and does not require unusual manipulation as some of the recently developed transportable lift trucks. Many other objects and advantages of the invention will be apparent from reading the description which follows in conjunction with the accompanying drawings.

DESCRIPTION OF A PREFERRED EMBODIMENT OF THE INVENTION

Figure 1:
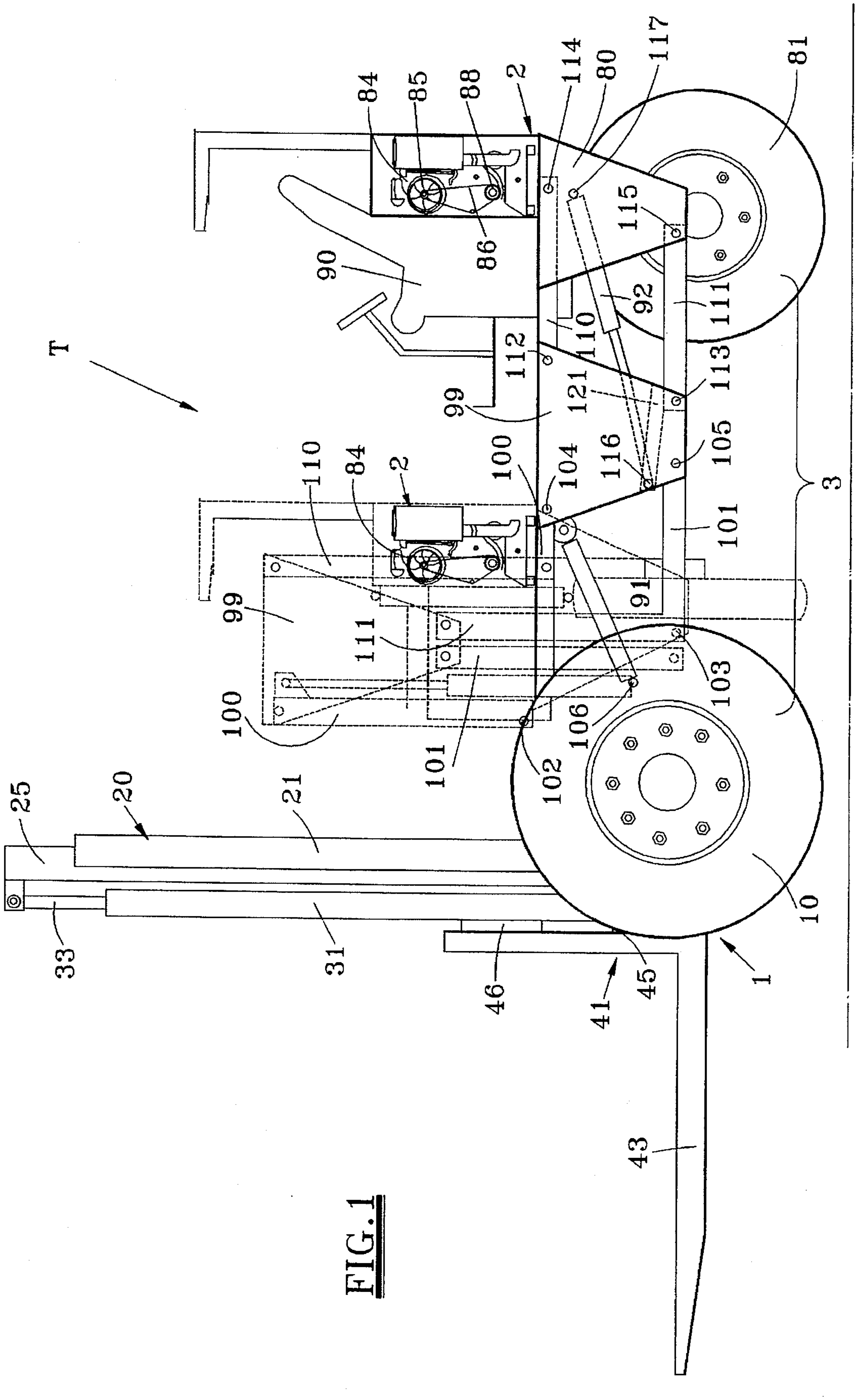
FIG. 1 is a side elevation view of a self-propelled lift truck, according to a preferred embodiment of the invention.
Figure 2:
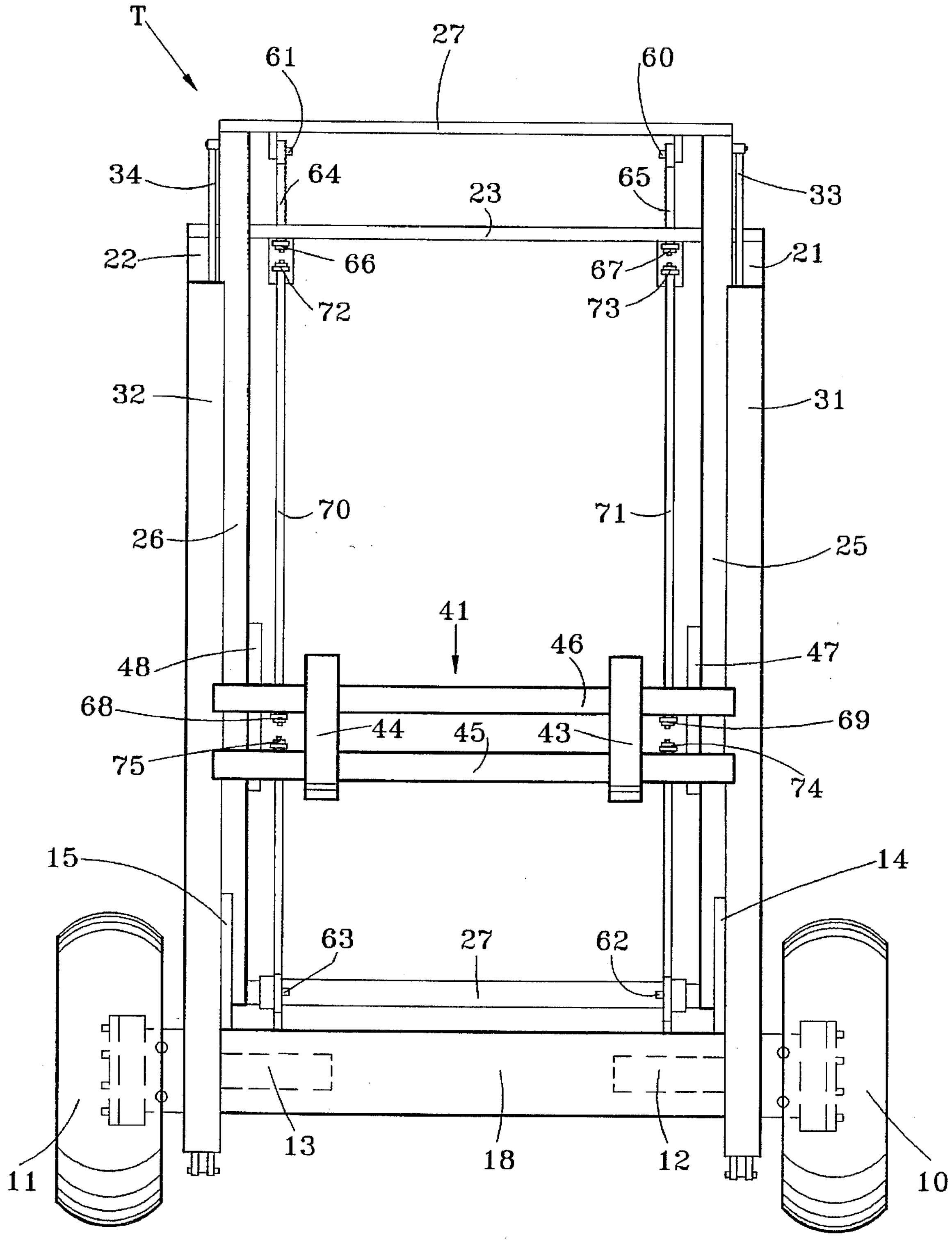
FIG. 2 is a front elevation view of the self-propelled lift truck of FIG. 1, according to a preferred embodiment of the invention.

Referring first to FIGS. 1 and 2, there is shown a self-propelled lift truck T having a forward carriage assembly 1 and a rearward carriage assembly 2 connected by a unique articulated support assembly 3. The forward carriage assembly includes a pair of spaced apart ground engageable wheels 10,11 driven by hydraulic motors 12,13 connected to variable displacement hydraulic pumps as will be more fully understood hereafter. The forward carriage assembly 1 includes support plates 14,15 transversely connected by a box beam 18 therebetween.

Supported on the forward carriage assembly 1 is a vertical mast 20 which comprises a fixed outer mast which includes vertical supports 21, 22 attached to the box beam 18 and/or the inner support plates 14 and 15 by welding or the like. The outer mast support members 21 and 22, in the exemplary embodiment, are made of channel members and may be connected, behind vertical members 25, 26, by one or more cross members 23. Mounted, for reciprocal vertical movement relative to the fixed vertical members 21 and 22 of the outer mast, are a pair of inner mast support members 25, 26 connected at the upper ends thereof by bar 27. The lower ends of the inner mast support members 25, 26 are transversely connected by a structural support 27. The inner mast supports 25 and 26 are also preferably channel members, the open channels of which face mutually inward and to the web portion of which may be affixed rollers or guide members (not shown). These rollers or guide members ride within the channel of outer mast supports 21 and 22, allowing the inner mast to move upwardly or downwardly relative to the fixed outer mast.

To effect such upwardly or downwardly relative motion of the masts, double acting hydraulic rams 31, 32 are provided, the lower ends of which are fixed in some type of connection for support by box beam 18. The upper ends of the ram rods 33, 34 are connected to the inner mast members 25, 26 near the cross member 27. Thus, extension of the ram rods 33, 34 raises the inner mast within the outer mast and retraction of the ram rods 33, 34 lowers the inner mast within the outer mast.

A forwardly projecting fork assembly 41 is mounted on the mast assembly and includes a pair of forks 43,44 transversely connected by cross support members 45 and 46. The forks 43 and 44 have forwardly projecting tines or prongs bent at approximately ninety degree angles from the proximal ends thereof. The proximal portions of the forks 43, 44 are welded to the cross supports 45,46. The tines or prongs provide the surfaces on which loads to be handled by the lift truck are supported. Welded to the rear of the forks 43, 44 and cross support 45,46 are vertical supports 47, 48 from which outwardly project rollers (not shown) which engage the channels of inner mast support members 25,26.

At least a pair of upper rollers (not shown) and a corresponding pair of lower rollers (not shown) would be provided. Thus, the fork assembly 41 may reciprocate upwardly or downwardly relative to the inner mast.

Provided at the upper end of the inner mast are a pair of chain idlers 60 and 61. Provided at the lower end of the inner mast is a pair of lower idlers 62 and 63. Each of these pair of idlers 60,61 and 62,63 are associated with upper and lower corresponding pairs of chains. One end of a pair of upper chains 64, 65 is connected at 66 and 67 to cross member 23 connected between the outer mast support members 21 and 22. These chains 64, 65 run over their respective idlers 60, 61 and the opposite ends of the chains 64, 65 are connected, as at 68, 69, to a cross-member 46 of the fork assembly 41. The pair of lower chains 70, 71 terminate at 72 and 73 in a connection with the cross member 23. From these points of termination 72,73 the lower pair of chains 70, 71 run around idlers 62, 63 and back up to the fork assembly cross piece 45 where they terminate in connections 74, 75.

It will be understood from the laws of mechanics that if hydraulic fluid pressure is applied to the base of the double acting hydraulic rams 31, 32 causing the inner mast to move upwardly one foot relative to the outer mast, the fork assembly 41, due to the chain and idler interconnection, will move upwardly one foot relative to the inner mast but two feet relative to the outer mast. However, there is a loss of mechanical advantage. For example, if an upward force F is applied by the hydraulic rams 31, 32, the fork assembly 41 will only lift a load of one half F. For present purposes, it is sufficient to know that extension or retraction of the rams 31, 32 will extend or retract the mast assembly and lift or lower the fork assembly 41.

Referring now more specifically to FIG. 1, the rearward carriage assembly 2 comprises a pair of outer support plates, only one 80 of which is shown in FIG. 1, transversely connected by structural support members (not shown) and below which is attached a pair of swivel or castered wheels 81 (or a single wheel). The wheels 81 are mounted on opposite sides of a wheel strut (not shown) which is mounted in a bearing assembly for free swiveling about a vertical axis. Mounted on the rear carriage assembly is an internal combustion engine 84 having an output pulley 85 which drives a belt 86 which in turn engages other pulleys, such as pulley 88, attached to the shafts of several pumps (not shown). One of these pumps is preferably a positive displacement pump which is connected to the lift rams 31, 32 and at least two other hydraulic rams 91, 92 to be more fully described hereafter. The other two pumps are variable displacement pumps, each one of which is connected to one of the hydraulic motors 12 or 13 which drives corresponding wheels 10 and 11. Of course other types of power transmission devices may be used. The variable displacement pumps are controlled by push-pull cables or linkages (not shown) manipulated by a single joy stick which provide forward, reverse and turning motion by articulation of pump control levers. Speed is variable, forward and reverse. The wheel pump controls and other controls for the pumps connected to the rams 31, 32, 91, 92 are located for operation by an operator seated on a seat 90, preferably near the center of the lift truck T. A redundant set of controls (not shown) may be provided at the forward carriage assembly 1 to facilitate folding.

The forward carriage assembly 1 and rearward carriage assembly 2 are uniquely connected by forward and rearward transversely spaced apart articulated support members. In the preferred embodiment, there are first or left hand pairs of forward and rearward support members and second or right hand pair of forward and rearward support members. The first pair (left hand pair) of forward support members shown in FIG. 1 includes an upper elongated member 100 and a lower elongated member 101 of substantially equal length. The foremost ends of the upper and lower elongated members 100, 101 are pivotally attached to the forward carriage assembly 1 by pins 102, 103. The rearmost ends of the elongated support members 100,101 are pivotally connected to an intermediate plate 99 (the left hand one of a pair of transversely spaced plates) by pins 104, 105. It will be noted that the distance between the center lines of pins 102 and 103 and the center lines of pins 104 and 105 are substantially equal. Thus, the elongated support members 100 and 101 and parallel lines drawn through the centers of corresponding pins 102, 103 and 104, 105 define a parallelogram. The second pair (right hand pair) of support members would be identical to upper and lower elongated members 100, 101 but on the opposite side of lift truck T.

The first pair (left hand pair) of rearward support members shown in FIG. 1 includes an upper elongated member 110 and a lower elongated member 111 of substantially equal length. The foremost ends of the upper and lower elongated members 110, 111 are pivotally attached to the intermediate plate 99 by pins 112, 113. The rearmost ends of the elongated support members 110, 111 are pivotally connected to the rear carriage assembly 2 by pins 114, 115. It will be noted that the distance between the center lines of pins 112 and 113 and the center lines of pins 114 and 115 are substantially equal. Thus the elongated support members 110 and 111 and parallel lines drawn through the centers of corresponding pins 112, 113 and 114, 115 also define a parallelogram. The second pair (right hand pair) of rearward support members would be identical to upper and lower elongated members 110, 111 but on the opposite side of lift truck T.

Connected by a pivot connection 106 to the forward carriage assembly 1, as indicated in FIG. 1, and by pivot connection 107 to the upper support member 100 is an extendable and retractable double acting hydraulic ram 91. There would be only one ram 91 associated with one pair of support members 100, 101 or two rams 91 one for each pair (left hand and right hand). Of course, extension and retraction of the ram 91 will effect relative longitudinal displacement of the upper and lower support members 100,101 with each other. Such movement can also cause the forward carriage assembly 1, the mast components and the fork assembly 41 to tilt downwardly or upwardly, if desired. It can also be understood that if the forward carriage assembly is restrained from movement, extension of the ram 91, due to the parallelogram arrangement of the support members 100,101, will cause the support members 100,101 to pivot on the pins 102, 103 from the relatively horizontal positions shown in FIG. 1 to upwardly directed relatively vertical positions illustrated by dotted lines in FIG. 1. As this occurs, the intermediate plate 99, the rear carriage 2 and all the components supported thereby could also be elevated to a vertical position directly above the forward carriage 1. However, operation of hydraulic ram 92 would modify such movement.

The hydraulic ram 92 (in an extended position in FIG. 1) is connected to the lower support member 111, or an extension 121 therefrom, by a pivot connection 116. It is connected by pivot connection 117 to the support plate 80 of the rear carriage assembly 2. The ram 92 is an extendable and retractable double acting hydraulic ram and there could also be another one associated with the right hand pair of rearward support members on the opposite side of truck T. Retraction and extension of the ram 92 will effect relative displacement of the upper and lower support members 110, 111 with each other. It can be understood that if the ram 92 is retracted or foreshortened, the parallelogram arrangement of support members 110, 111 would, if not prevented by other restraints, cause the support members 110, 111 to pivot on pins 112, 113 from the relatively horizontal positions shown in FIG. 1 to downwardly directed relatively vertical positions illustrated by dotted lines in FIG. 1.

It should be understood that the rams 91, 92 could be activated simultaneously or sequentially. For example, as ram 91 is extended lifting intermediate plate 99 upwardly, ram 92 could be retracted, keeping rear carriage 2 at substantially the same level as forward carriage 1. This would result in the relative positions shown by dotted line in FIG. 1. Conversely, if the ram 91 would then be retracted while ram 92 is extended the support members 100, 101, 110, 111, intermediate plate 99 and rear carriage assembly 2 would all return to the normal operating positions shown by solid lines in FIG. 1.

Figure 3:
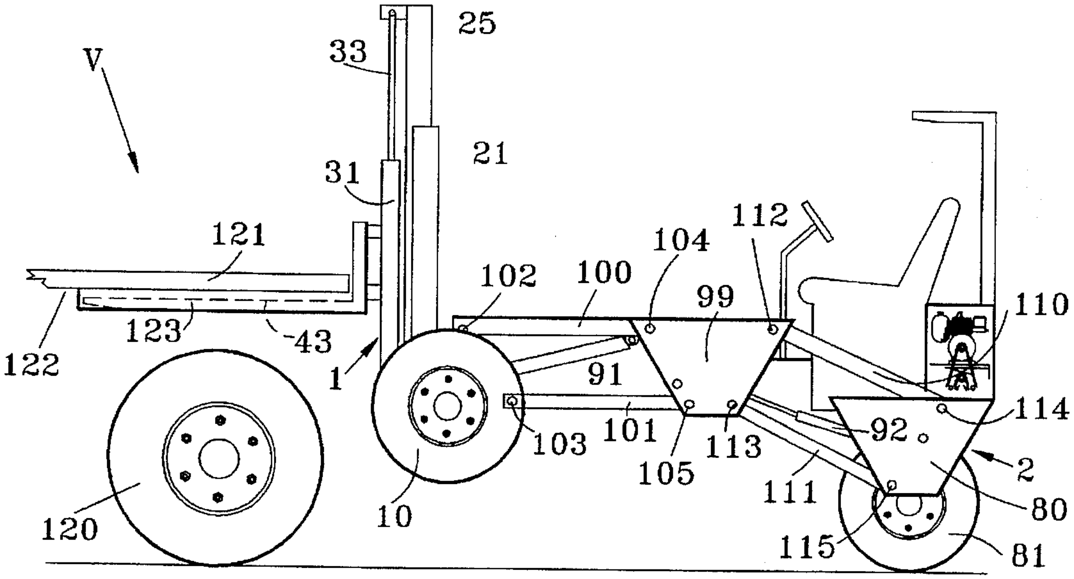
FIG. 3 is a side elevation view of the self-propelled lift truck of FIGS. 1 and 2 showing the lift truck attached to and supported from the rear of a vehicle so that at least a part of the lift truck is off of the ground.

Referring now to FIG. 3, there is shown the rear end of a vehicle V such as a truck or trailer having a rear wheel 120 and a truck bed or surface 121 supported on a truck bed frame 122. The truck bed frame 122 or the truck chassis is provided with a pair of tubular horizontal supports 123 which are spaced to receive, if properly aligned in elevation and azimuth, the forks 43,44 of the fork assembly 41 of the lift truck T of the present invention. Initially, the lift truck T could be used to load materials onto the vehicle V. After loading all the materials onto vehicle V the lift truck T would be driven to the rear of the vehicle V and the fork assembly 41 would be raised until the fork projections 43 and 44 are at a level corresponding with the tubular supports 103. Then the lift truck T would be driven forward so that the tines or prongs 43,44 of the fork assembly 41 would engage the tubular member 103 as shown in FIG. 3. However, the wheel 10 would be adjacent to the ground.

At this point, the hydraulic rams 31, 32 could be activated for retraction. Since the fork assembly 41 is restrained in a vertically fixed position by tubular supports 123, the mast would be contracted and at least the forward part of lift truck T would be lifted off the ground as shown in FIG. 3. As the forward end of the truck T is lifted, the ram 92 could be simultaneously retracted so that the rear carriage assembly 2 would remain at least partially supported on the ground. At some point when the lift truck T is lifted off of the ground a sufficient distance, the operator of the lift truck would walk to the forward carriage to operate the redundant set of controls and activate the ram 91, extending the ram 91 and causing the support members 100,101 to pivot from the substantially horizontal position shown in FIG. 3 to the substantially vertical position shown in FIG. 4 and as previously described with reference to the dotted line position in FIG. 1. Cooperative activation of ram 92 would cause the support members 110, 111 to pivot downwardly to their final substantially vertical position of FIG. 4 and as previously described with reference to the dotted line position in FIG. 1. The engine 84 and all of the pumps and other components mounted on the rear carriage assembly 2 would remain in an essentially erect position reaching a final position directly to the rear of the forward carriage 1.

Figure 4:
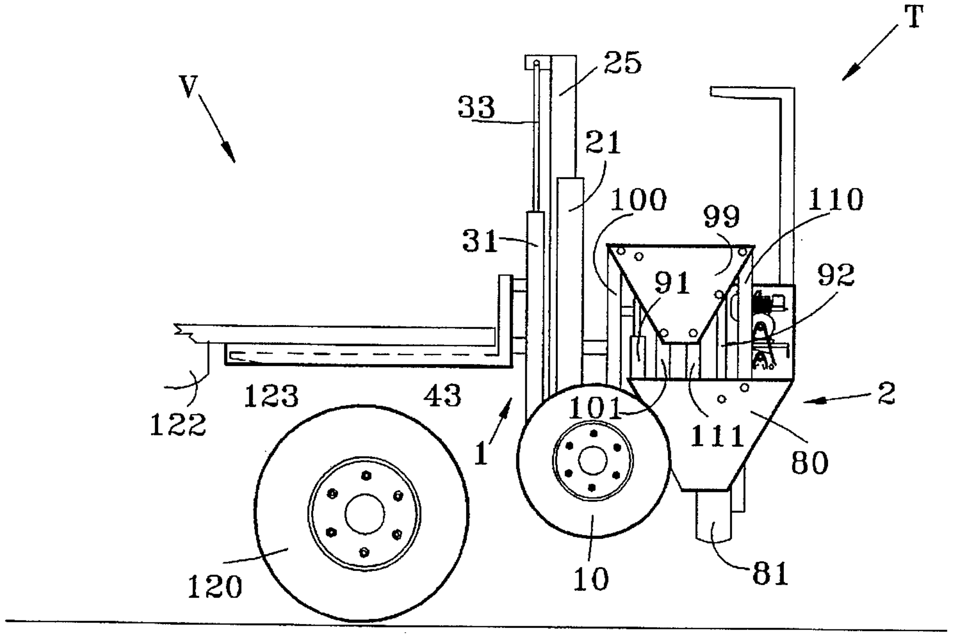
FIG. 4 is a side elevation view, similar to that of FIG. 3, showing the self-propelled lift truck of the present invention off the ground and pivotally folded from a horizontal position, such as shown in FIG. 1, to a vertical position for transportation on the vehicle to another location.

After reaching the folded position of FIG. 4, chains may be connected to the vehicle bed or bed frame 121, 122 and to the elongated support members 100,101 so as to maintain the position of FIG. 4 for secure road travel. The operator may reverse the control of rams 91 or 92 to snug the chains and drive the mast of the lift truck T against the rear of the trailer bed 121. The lift truck T is then in a secure position for highway travel.

When the destination of unloading is reached, the operator would direct flow to the rams 91 and/or 92 so that the pairs of support members move slightly forward, slacking the chains and allowing the chains to be disconnected. Then the operator would direct flow to the lift rams 31, 32 extending the mast assembly and lowering the entire lift truck T, in the folded position of FIG. 4, until the front wheels 10 and 11 engage the ground. The operator would then direct flow to the rams 91, 92 causing ram 91 to retract and ram 92 to extend, unfolding the frame as the support members 100, 101 and 110, 111 pivot from the vertical positions of FIG. 4 to the horizontal positions of FIG. 1. Once the rear wheels 81 contact the ground, the operator may remount the seat and direct flow to the hydraulic motors 12 and 13 to back the lift truck away from the vehicle V. The lift truck T is then ready for unloading materials 124 from the vehicle V or any other work that is needed therefrom.

Thus, the self-propelled lift truck of the present invention provides moderately elevated lifting and unloading capabilities with ease of operation. A mast and fork assembly is carried on a forward carriage assembly which is connected to a rearward carriage assembly by a unique arrangement of articulated support members. This arrangement provides tilting capabilities to the forward carriage assembly and the mast and fork assembly carried thereby. It also permits folding or pivoting movement of the support members and rearward carriage from a horizontal ground engaging position to vertical positions directly adjacent the forward carriage while the forward carriage is restrained from movement. In addition, the mast and fork assembly are connected in such a way that the entire lift truck may be self-elevated and carried, in a folded position, on the rear of a carrying vehicle. The resulting center of gravity would be more forward and lower than with lift trucks of the prior art. Stability and road handling would be greatly improved.

A single embodiment of the invention has been described herein. However, many variations can be made without departing from the spirit of the invention. For example, the pairs of support members 100, 101, 110, 111 could be single members with the engine 84 attached directly to the rear of members 110 or 111. In such a case, the engine 84 would not remain horizontal when folded. The engine would rotate ninety degrees. Furthermore the sequence of operation of the lift rams 31, 32 and rams 91, 92 could be varied in several ways. In any event, it is intended that the scope of the invention be limited only by the claims which follow.

We claim:

1. A self-propelled lift truck having a fork assembly for lifting and lowering of loads thereon, said lift truck comprising:

a forward carriage assembly which includes a pair of spaced apart ground engageable wheels and a vertical mast on which is mounted a forwardly projecting fork assembly for relative upward and downward movement thereon;

a rearward carriage assembly which includes at least one ground engageable wheel;

first and second transversely spaced apart elongated forward support members foremost ends of which are pivotally attached to said forward carriage assembly;

first and second transversely spaced apart elongated rearward support members rearmost ends of which are pivotally attached to said rearward carriage assembly;

first and second transversely spaced apart intermediate support members to which rearmost ends of said forward support members and foremost ends of said rearward support members are pivotally attached; and power means connected to said support members, activation of said power means effecting pivotal movement and angular displacement of said forward and rearward elongated support members relative to said forward carriage assembly.

2. A self-propelled lift truck as set forth in claim 1 in which said power means comprises an extendable and retractable forward power device, one end of which is connected to said forward carriage assembly and an opposite end of which is connected to one of said forward support members, and an extendable and retractable rearward power device, one end of which is connected to said rearward carriage assembly and an opposite end of which is connected to one of said rearward support members.

3. A self propelled lift truck as set forth in claim 2 in which said forward power device, upon restraint of said forward carriage assembly, is capable, upon extension and retraction thereof, of effecting angular displacement of said forward support members between relatively horizontal positions and relatively vertical positions parallel with said vertical mast and in which said rearward power device is capable, upon extension and retraction thereof, of effecting angular displacement of said rearward support members between relatively horizontal positions and relatively vertical positions parallel with said vertical mast.

4. A self-propelled lift truck as set forth in claim 3 in which said forward support members, upon angular displacement to said vertical positions, pivot about their foremost ends in an upward direction and in which said rearward support members, upon angular displacement to said vertical positions, pivot about their foremost ends in a downward direction.

5. A self-propelled lift truck as set forth in claim 4 in which said forward and rearward support members, when pivoted to said vertical positions thereof, move said rearward carriage assembly to a position immediately adjacent and to a rear of said forward carriage assembly.

6. A self-propelled lift truck as set forth in claim 5 in which said vertical mast and said fork assembly are operatively connected and provided with power lift means for effecting upward and downward movement of said fork assembly relative to said mast so that if said fork assembly is restrained in a vertically fixed position, said mast, said carriage assemblies and said connecting support members may be lifted off the ground by said power lift means.

7. A self-propelled lift truck as set forth in claim 1 in which said vertical mast and said fork assembly are operatively connected and provided with power lift means for effecting said upward and downward movement of said fork assembly relative to said mast so that if said fork assembly is restrained in a vertically fixed position, said mast, said carriage assemblies and said connecting support members may be lifted off the ground by said power lift means.

8. A self-propelled lift truck as set forth in claim 7 in which operation of said power means, when said fork assembly is in said restrained vertically fixed position, may cause said forward support members to pivot upwardly about said foremost ends thereof and said rearward support members to pivot downwardly about said foremost ends thereof, from substantially horizontal positions to substantially folded adjacent vertical positions, moving said rearward carriage assembly immediately adjacent and to a rear of said forward carriage assembly.

9. A self-propelled lift truck as set forth in claim 8 in which subsequent operation of said power means may cause said forward and rearward support members to pivot about said foremost ends thereof to return from said substantially vertical positions to said substantially horizontal positions.

10. A self-propelled lift truck as set forth in claim 7 in which subsequent operation of said power lift means may lower said mast so that said carriage assemblies reengage the ground and permit release of said fork assembly from said vertically fixed position.

11. A self-propelled lift truck having a fork assembly for lifting and lowering of loads thereon, said lift truck comprising:

a forward carriage assembly which includes a pair of spaced apart ground engageable wheels and a vertical mast on which is mounted a forwardly projecting fork assembly for relative upward and downward movement thereon;

a rearward carriage assembly which includes at least one ground engageable wheel;

first and second transversely spaced apart pairs of elongated forward support members of substantially equal length and foremost ends of which are pivotally attached to said forward carriage assembly;

first and second transversely spaced apart pairs of elongated rearward support members of substantially equal length and rearmost ends of which are pivotally attached to said rearward carriage assembly;

first and second transversely spaced apart intermediate support members to which rearmost ends of said pairs of forward support members and foremost ends of said pairs of rearward support members are pivotally attached; and power means connected to at least one member of a pair of said forward support members and at least one member of a pair of said rearward support members, activation of said power means effecting relative angular displacement of said forward and rearward pairs of elongated support members with each other.

12. A self-propelled lift truck as set forth in claim 11 in which each pair of said forward and rearward support members includes an upper support member and a lower support member of substantially equal length and a distance between corresponding ends of which are substantially equal so that said upper and lower support members of each pair of forward and rearward support members and lines passing between corresponding ends of said upper and lower support members define a parallelogram.

13. A self-propelled lift truck as set forth in claim 12 in which the length and relative spacing of the ends of said upper and lower elongated support members of each of said pairs of forward support members is such that if said forward carriage assembly is restrained from movement, activation of said power means will cause said pairs of forward support members to pivot at said attachment with said forward carriage assembly between relatively horizontal positions and relatively upwardly directed vertical positions.

14. A self propelled lift truck as set forth in claim 13 in which said power means comprises an extendable and retractable forward power device connected to at least one of said pairs of forward support members, extension and retraction of which effects relative longitudinal displacement of said upper and lower support members of said pairs of forward support members to pivot said forward support members between said relatively horizontal and upwardly directed vertical positions.

15. A self-propelled lift truck as set forth in claim 12 in which the length and relative spacing of the ends of said upper and lower elongated support members of each of said pairs of rearward support members is such that if said forward carriage assembly is restrained from movement, activation of said power means will cause said pairs of rearward support members to pivot at said attachment with said intermediate support members between relatively horizontal positions and relatively downwardly directed vertical positions.

16. A self-propelled lift truck as set forth in claim 15 in which said power means comprises an extendable and retractable rearward power device connected to at least one of said pairs of rearward support members, extension and retraction of which effects relative longitudinal displacement of said upper and lower support members of said pairs of rearward support members to pivot said rearward support members between said relatively horizontal and downwardly directed vertical positions.

17. A self-propelled lift truck as set forth in claim 12 in which said power means comprises extendable and retractable forward and rearward power devices, extension and retraction of said forward power device effecting relative longitudinal displacement of said upper and lower support members of said pairs of forward support members to pivot said forward support members between relatively horizontal and upwardly directed vertical positions, extension and retraction of said rearward power device effecting relative longitudinal displacement of said upper and lower support members of said pairs of rearward support members to pivot said rearward support members between relatively horizontal and downwardly directed vertical positions, said pairs of forward and rearward support members, when pivoted to said vertical positions thereof, moving said rearward carriage assembly to a position immediately adjacent and to a rear of said forward carriage assembly.

18. A self-propelled lift truck as set forth in claim 11 in which said vertical mast and said fork assembly are operatively connected and provided with power lift means for effecting said upward and downward movement of said fork assembly relative to said mast so that if said fork assembly is restrained in a vertically fixed position, said mast, said carriage assemblies and said connecting pairs of support members may be lifted off the ground by said power lift means.

19. A self-propelled lift truck as set forth in claim 18 in which operation of said power means, when said fork assembly is in said restrained vertically fixed position, may cause said pairs of forward support members to pivot upwardly about said foremost ends thereof and said pairs of rearward support members to pivot downwardly about said foremost ends thereof from substantially horizontal positions to substantially folded adjacent vertical positions moving said rearward carriage assembly immediately adjacent and to a rear of said forward carriage assembly.

20. A self-propelled lift truck as set forth in claim 19 in which subsequent operation of said power means may cause said pairs of forward and rearward support members to pivot about said foremost ends thereof to return from said substantially vertical positions to said substantially horizontal positions.

* * * * *